Dec. 9, 1969    C. R. HILPERT    3,482,668
CLUTCH HAVING A SKEWED SURFACE MEANS TO PREVENT FLUTTER
Original Filed June 2, 1967    3 Sheets-Sheet 1

INVENTOR:
CONRAD R. HILPERT
BY: James E. Nilles
ATTORNEY

INVENTOR:
CONRAD R. HILPERT
BY: James E. Nilles
ATTORNEY

Dec. 9, 1969     C. R. HILPERT     3,482,668
CLUTCH HAVING A SKEWED SURFACE MEANS TO PREVENT FLUTTER
Original Filed June 2, 1967     3 Sheets-Sheet 3
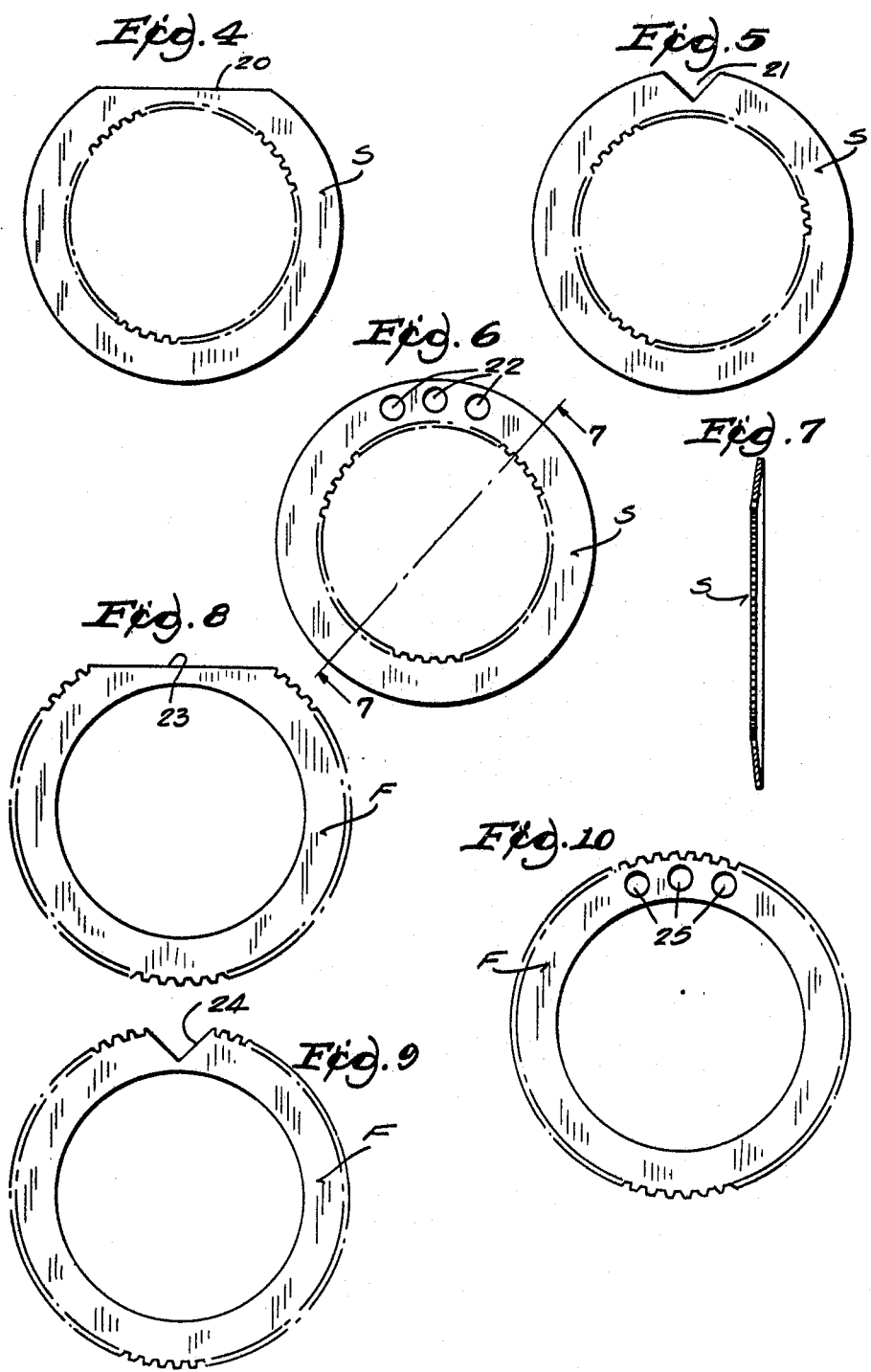
INVENTOR:
CONRAD R. HILPERT
BY: James E. Nilles
ATTORNEY 3,482,668
CLUTCH HAVING A SKEWED SURFACE MEANS
TO PREVENT FLUTTER
Conrad R. Hilpert, Winnebago, Ill., assignor to Twin Disc,
Incorporated, Racine, Wis., a corporation of Wisconsin
Original application June 2, 1967, Ser. No. 643,245.
Divided and this application Sept. 23, 1968, Ser.
No. 761,694
Int. Cl. F16d *13/13, 11/00, 13/60*
U.S. Cl. 192—70.14                           3 Claims

ABSTRACT OF THE DISCLOSURE

Means for preventing disengaged clutch plates from fluttering, that is, from wobbling like a coin that is coming to rest after it has been spinning on its edge. This gyroscopic instability, caused when the plates do not rotate in a plane normal to the clutch axis, occurs when alternate plates rotate in opposite directions.

CROSS REFERENCE TO RELATED APPLICATION

This application is a divisional of U.S. Ser. No. 643,245, filed June 2, 1967, which issued as Patent No. 3,446,323 on May 27, 1969.

BACKGROUND OF THE INVENTION

Friction plate clutches which have interleaved friction plates, and the alternate plates of which rotate in opposite direction, present serious problems due to flutter, wobble or gyroscopic instability of the plates. This flutter can occur in either the externally toothed plates connected to the interior of the clutch drum or in the internally toothed plates connected to the central hub of the clutch, or both; it is usually more prevalent in the externally toothed plates. When the clutch is supposed to be running in a disengaged position, plate flutter may suddenly cause a great increase in drag torque, thus causing extreme heat and burned plates, lock up of the clutch and total destruction.

When the usual symptoms of flutter occurred in the prior art, common practices to attempt to eliminate the symptoms were to grossly increase the amount of cooling oil flowing past the plates, or insert small springs between the plates. While these practices did provide some improvement under certain conditions, they were not generally satisfactory.

SUMMARY OF THE INVENTION

The present invention provides means for eliminating flutter in counter rotating clutch plates by limiting or damping axial movement of the plates in their drums or on their hubs.

The invention prevents flutter in a clutch by using skewing means, that is a surface formed at an incline to the clutch axis. The skewed surface forces the plates to be bumped into normal alignment to the clutch axis, and holds them in position to prevent flutter. The invention also contemplates the use of such a skewed surface with unbalanced externally toothed plates and/or with unbalanced internally toothed plates.

These and other objects and advantages of the present invention will appear as this disclosure progresses.

BRIEF DESCRIPTION OF THE DRAWINGS

FIGURES 4 to 6 are views of internally toothed clutch plates showing various ways in which material may be removed therefrom to result in unequal weighting or unbalance of these plates;

FIGURE 7 is a sectional view taken along lines 7—7 in FIGURE 6 and showing the "coned" shape of these internally toothed plates;

FIGURES 8 to 10 are views similar to FIGURES 4 to 6 but the unbalance being applied to externally toothed plates;

DESCRIPTION OF THE PREFERRED EMBODIMENT

The following description will be directed to a friction clutch of the type having interleaved clutch plates.

Some of these plates have external teeth around their outer periphery which are rotationally fixed in an internally splined or grooved clutch drum. These plates will be referred to as externally toothed plates and are usually faced with a waffle pattern for cooling and wear purposes. Flutter of those externally toothed plates may be referred to as "normal" flutter.

The other plates are internally toothed plates and are axially slidably on the splines of a clutch hub and are sometimes referred to as steel plates. These plates may be "coned," that is slightly dished-shaped, say 0.010 to 0.015 of an inch across the width of their ring, and this "coning" reduces the maximum possible "run out." Run out is the axial distance the plates and the actuating member must move to cause clutch clamp-up. These coned plates flatten out when clamped up. Flutter of these plates may be referred to as "inverse" flutter.

Plate flutter occurs when the clutch is disengaged in counter-rotating clutches, that is, where one set of plates rotates in one direction and the alternate plates rotate in the opposite direction and it is to this environment that the present invention is directed.

Flutter is a term which will be used herein to describe the movement of the plates in rotating in a plane other than normal to the clutch axis and with a whirl or wobble. Perhaps flutter can best be described as similar to the action of a coin that had been set on its edge and spun, and then starts to come to rest by "walking around" on its rim, in one location. This flutter can increase the torque of the clutch when it is supposed to be released, and causes burn out of the plates, and damage to the entire clutch and associated parts.

Flutter is due to "gyroscopic instability" of the plates, and is not (as previously thought by many skilled in the prior art) due to "hydrodynamic pumping action" of the plates. Flutter symptoms could be eliminated by the simple expedient of gross increases in cooling oil flow between the plates, but on the other hand flutter also existed when no cooling oil flow occured.

It may also be helpful at this juncture to discuss Euler's equation of motion in connection with an explanation of clutch flutter. As found in S. Timoshenko and D. H. Young's book "Advanced Dynamics" (first edition, chapter V, page 346, figure 260, equation 170, McGraw-Hill, New York, 1948), this equation is as follows:

$$-Mn = -[Iw + (I - I_1)w_1 \cos \Theta]w_1 \sin \Theta$$

Figure 1:
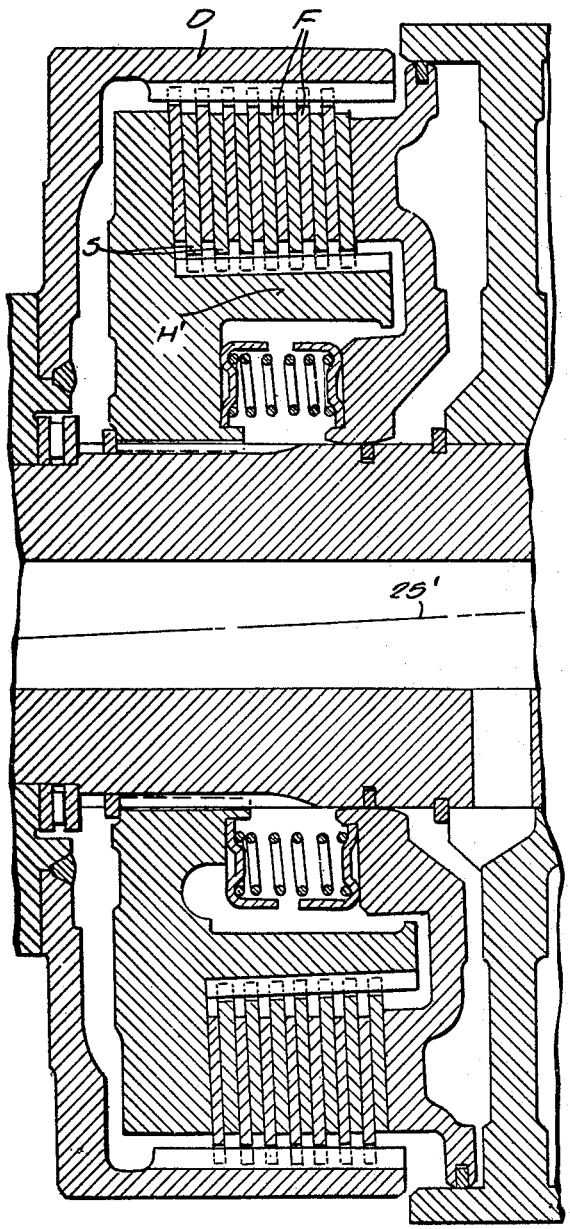
FIGURE 1 is a longitudinal, cross sectional view through a hydraulically actuated friction clutch utilizing the present invention.
Figure 11:
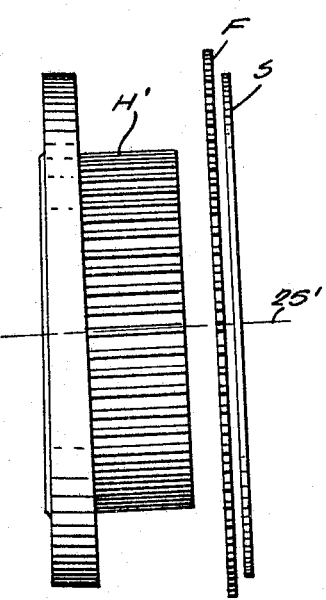
FIGURE 11 is an elevational view of the skewed hub form of the invention, together with a pair of plates usable therewith.
Figure 1A:
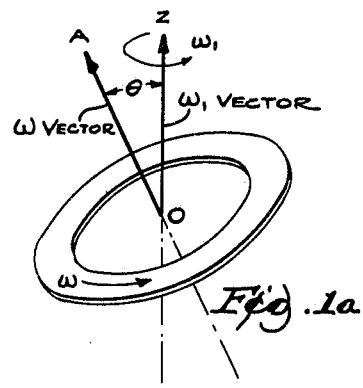
FIGURE 1a is a diagram of certain forces as applied to a clutch plate.

Reference is also made to FIGURE 1a of the drawings which shows a diagram of these forces as applied to a clutch plate.

In the above equation, the symbols are defined as follows:

$Mn$ = moment in AOZ plane tending to change value of $\Theta$.
$I$ = moment of inertia of disc about disc axis (AO).
$I_1$ = moment of inertia of disc about a diameter.
$w$ = rotational velocity of disc about disc axis (AO).
$w_1$ = rotational velocity of disc axis about intersecting and inclined axis (ZO).
$\Theta$ = angle between disc axis (AO) and inclined axis (ZO).

The above formula may be applied to a clutch and in this respect reference is made to FIGURE 1 of the drawings where the clutch drum D has the externally tooth disc plates F fixed thereto for rotation therewith but for axially sliding relative thereto in the known manner. The clutch hub H has the internally toothed discs S similarly splined thereto for axially sliding on the hub and for rotation therewith. The total indicated runout or wobble of the discs is the total clearance between the clutch plates. For a detailed discussion of this formula as applied to a clutch of the present type, reference may be had to the said co-pending application.

Figure 2:
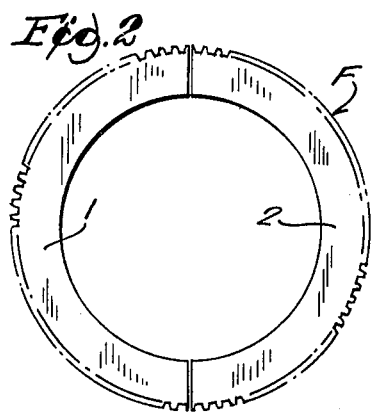
FIGURES 2 and 3 are transverse views, on a reduced scale, of externally toothed clutch plates used with the present invention.
Figure 3:
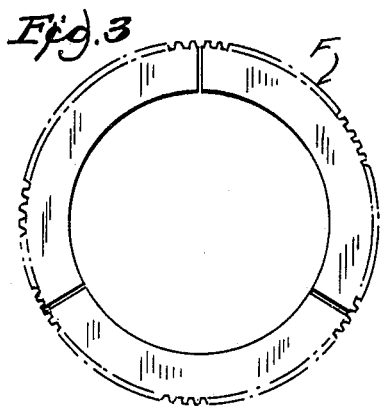

Referring in greater detail to the figures, externally toothed plates are formed as a number of segments, that is splitting the disc, preferably into two halves as shown in FIGURE 2. Other numbers of segments may be used, say for example three (see FIGURE 3), but numbers greater than this are undesirable because the individual pieces tend to spin or turn on their own individual axes. As shown in FIGURE 2, the externally toothed discs F are split in two halves 1 and 2, and centrifugal force causes these halves to move outwardly, thus creating frictional forces of the teeth against their grooves or splines 4 in the clutch drum D.

I have found that by splitting and arranging the plates as above mentioned, normal flutter is prevented under many circumstances. Under other circumstances it may be necessary or desirable to combine the above mentioned split plates with other types of unbalance and these will now be described.

I am aware that clutch plates have been split, per se, to facilitate assembly or to eliminate torsional vibration rattle.

It may be mentioned that the plates S cannot be split, as above described for plates F, in order to achieve this unbalance, because centrifugal force acts to actually disengage the internal teeth of the plate S from the hub, contrary to the desired result.

FIGURES 4 TO 10

In FIGURES 4 to 10, means for unbalancing either of the plates F or S are provided by the present invention.

I have found that shifting the weight of the plates S so that they are unbalanced as to weight, creates the necessary friction on their internal teeth with the hub H so that axial movement is damped. This arrangement is shown in FIGURES 4 to 7 where portions 20, 21 and 22 are cut out from the plates at one side thereof.

FIGURES 8 to 10 show similar portions 23, 24 and 25 cut out from externally toothed plates F.

In this manner, either the internal or external toothed plates, or both, may be unbalanced by shifting their weight out of concentricity, that is for example, by removing a portion of the metal from one side of the plates, that is, from circumferentially unequal portions.

Means are provided for purposely causing normal flutter, i.e., slanting of the plates mounted on the hub, in combination with unbalanced plates, so that the clutch positively will be characterized by a normal flutter which can be eliminated, rather than characterized by an "Inverted" flutter. This is accomplished by providing a skewed surface, for example by skewing or inclining the hub H' along the axis 25' (FIGURE 1). Thus axis 25' represents the angle of inclination of the hub with respect to the rotative axis of the clutch. It is on this inclined hub H' that the internal toothed plates S are mounted, which positively causes flutter thereof that in turn causes a very high level of excitation to "normal" flutter operation. In other words, the wobbling hub plates S bump the split plates F into normal alignment or zero runout and the friction generated by the split plates F holds them in this aligned position.

I claim:
1. In a counter-rotating, interleaved friction plate clutch of the type having a rotatable drum and also a rotatable hub, said drum and hub rotating in opposite directions when said clutch is disengaged, externally toothed plates mounted for axial sliding on the interior of said drum and for rotation therewith, internally toothed plates axially slidable on said hub for rotation therewith, and means to cause axial shifting of said plates between clutch disengaged and engaged positions, the improvement comprising means for causing unbalance of at least some of said plates to thereby create frictional forces between the teeth of at least some of said plates and the member on which they are mounted to thereby dampen axial flutter movement of said plates when said clutch is in a disengaged position, said means providing an inclined surface to the clutch axis and engaging some of said plates where by when said clutch is disengaged some of said plates are caused by said inclined surface to bump into other plates and bias them to a normally aligned position.

2. The clutch set forth in claim 1 further characterized in that said externally toothed plates are split and formed by a plurality of plate segments.

3. The clutch as defined in claim 1 further characterized in that said means includes and hub being formed on a skew or incline to the clutch axis whereby the internally toothed plates mounted thereon will be caused to bump into said externally toothed plates when said clutch is in said disengaged position, thereby biasing the externally toothed plates to a normally aligned position.

References Cited
UNITED STATES PATENTS

| | | | |
|---|---|---|---|
| 814,132 | 3/1906 | Hele-Shaw | 192—107 XR |
| 860,590 | 7/1907 | Williams | 192—107 XR |
| 991,482 | 5/1911 | Cox | 192—107 XR |
| 1,189,176 | 6/1916 | Price | 192—107 XR |
| 1,910,084 | 5/1933 | Bixby | 192—110 XR |
| 2,236,652 | 4/1941 | Shurts et al. | 192—110 XR |
| 2,330,856 | 10/1943 | Adamson | 192—70.14 |
| 2,738,864 | 3/1956 | Becker | 192—70.11 |
| 3,205,288 | 9/1965 | Puls | 192—70.11 |
| 3,236,347 | 2/1966 | Puls et al. | 192—70.27 |
| 3,330,391 | 7/1967 | Mamo | 192—70.12 |

MARTIN P. SCHWADRON, Primary Examiner

LESLIE J. PAYNE, Assistant Examiner

U.S. Cl. X.R.

192—70.13, 107, 110